United States Patent [19]

Szymanski et al.

[11] 4,455,408

[45] Jun. 19, 1984

[54] PROCESS FOR REACTING QUATERNARY AMMONIUM MONOMERS IN THE PRESENCE OF ANIONIC POLYMERS

[75] Inventors: Chester D. Szymanski, Martinsville; Dennis Neigel, Whitehouse Station, both of N.J.

[73] Assignee: National Starch and Chemical Corporation, Bridgewater, N.J.

[21] Appl. No.: 407,014

[22] Filed: Aug. 11, 1982

[51] Int. Cl.$^3$ ............... C08L 33/08; C08L 33/10; C08L 25/18
[52] U.S. Cl. ................... 525/291; 525/293; 525/287; 525/274; 525/296
[58] Field of Search ............ 525/293, 291, 274; 524/460

[56] References Cited

U.S. PATENT DOCUMENTS

| | | | |
|---|---|---|---|
| 2,923,701 | 2/1960 | Schuller et al. | 260/85.5 |
| 3,284,393 | 11/1966 | Vanderhoff et al. | 260/29.6 |
| 3,288,770 | 11/1966 | Butler | 260/88.3 |
| 3,461,163 | 8/1969 | Boothe | 260/567.6 |
| 3,539,510 | 11/1970 | Priesing et al. | 210/52 |
| 3,920,599 | 11/1975 | Hurlock et al. | 260/29.64 |
| 4,128,538 | 12/1978 | Burness et al. | 525/291 |

Primary Examiner—Carman J. Seccuro
Attorney, Agent, or Firm—Edwin Szala; Ellen T. Dec

[57] ABSTRACT

Quaternary ammonium monomers and monomers co-poylmerizable therewith are reacted in the presence of anionic polymers to directly form a dry coacervate by a process which comprises forming a solution comprising the monomer(s), the anionic polymer, solvent(s) and a free-radical initiator and simultaneously polymerizing and drying the solution at a temperature above the boiling point of the solvent.

13 Claims, No Drawings

PROCESS FOR REACTING QUATERNARY AMMONIUM MONOMERS IN THE PRESENCE OF ANIONIC POLYMERS

The present invention is directed to a process for reacting quaternary ammonium monomers and monomers copolymerizable therewith in the presence of anionic polymers and forming a coacervate directly in dry form. The process involves forming a concentrated solution of the respective monomer(s), an anionic polymer, initiators and any other reactants, and thereafter simultaneously polymerizing the monomer(s) and drying the solution.

The most generally employed prior art processes for producing homo- and copolymers of quaternary ammonium monomers, particularly quaternized diallyl amines such as dimethyldiallylammonium chloride (DMDAAC), yield a final product in the form of a solution or oil-in-water latex. In order to obtain a dry solid, it is then necessary to separate and dry or otherwise isolate the desired fraction. Typical of such methods are those described in U.S. Pat. Nos. 2,923,701; 3,284,393; 3,288,770; 3,461,163 and 3,920,599.

In copending application, Ser. No. 407,015 filed on even date herewith, there is disclosed a process for directly producing these homo- and copolymers in dry form using a process which involves the simultaneous polymerization and drying of a solution of the respective monomers. The disclosure of that application is incorporated herein by reference.

There are a number of applications in industry wherein it is desired to utilize a blend of cationic homo- or copolymers of quaternary ammonium monomers with certain anionic polymers. Thus, U.S. Pat. No. 3,539,510 teaches the advantages in flocculating applications of utilizing high molecular weight anionic polymers which are modified with certain cationic, water-soluble amino polymers. Other potential uses include, for example, as electroconductive agents in photographic, fiber, membrane or paper applications.

While the benefits achieved by using such materials will be apparent, the difficulties inherent in their production, transportation and storage are formidable since the water soluble polymers of opposite charges will interact ionically in water solution to form a precipitate or sometimes a gel or pultaceous coacervate. Transportation and/or storage of such polymer solutions is thus very difficult and the drying of such pre-reacted gels or coacervates entails considerable energy and time.

In accordance with the present invention, quaternary ammonium monomers and monomers copolymerizable therewith are reacted in the presence of anionic polymers to directly form a dry coacervate by a process which comprises forming a solution comprising the monomer(s), the anionic polymer, solvent(s) and a free-radical initiator and simultaneously polymerizing and drying the solution at a temperature above the boiling point of the solvent.

By utilizing this process, a number of benefits are achieved. Thus, the direct conversion from monomer to dry solid avoids the need for the plurality of steps required by prior art techniques. Furthermore, since the coacervate forms in situ and is dried immediately one avoids the necessity of handling the gelled solution. By using the heat of polymerization to effect drying, a more energy conserving process is provided. Finally this process avoids the possibility of dangerous exotherms which may occur in a conventional solution polymerization so there is no need to control the heat of polymerization through heat transfer to a jacket.

DETAILED DESCRIPTION OF THE PREFERRED EMBODIMENTS

The preferred quaternary ammonium monomers employed herein are represented by the following formula:

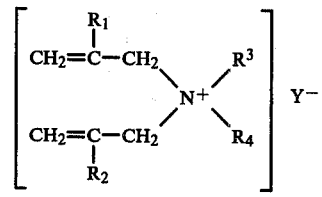

where $R_1$ and $R_2$ each represent a member of the class consisting of hydrogen and methyl and ethyl radicals; $R_3$ $R_4$ each represent a member of the class consisting of alkyl, aryl, cycloalkyl, hydroxyalkyl and alkoxyalkyl radicals having from 1 to 18 carbon atoms; and $Y^-$ represents an anion.

Illustrative examples of radicals represented by $R_3$ and $R_4$ are methyl to octadecyl alkyl radicals, inclusive; and methoxymethyl and the various higher alkoxy (e.g. methoxy to octadecoxy, inclusive) alkyls, e.g. ethyl to octadecyl alkyl radical, inclusive; the corresponding hydroxyalkyl, cycloalkyl radicals, etc. Illustrative examples of anions represented by Y are the halide ions, sulfate, sulfonate, phosphate, hydroxide, borate, cyanide, carbonate, thiocyanate, thiosulfate, isocyante, sulfide, cyanate, acetate and the other common inorganic and organic ions.

Specific examples of monomers useful herein are the diallyl, dimethyldiallyl, dimethallyl and diethallyl dimethyl, di-(beta-hydroxyethyl) ammonium chlorides, bromides, phosphates and sulfates.

In producing copolymers of the quaternized ammonium monomers, any monomeric entities which are substantially non-volatile at the reaction temperatures and which contain a single

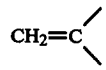

grouping and which are typically copolymerizable with the quaternized ammonium monomers may be used. Preferably, the monomers are of the general formula:

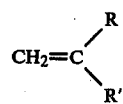

where R represents a member of the class consisting of hydrogen, halogen and alkyl, cycloalkyl, aryl, alkaryl and aralkyl radicals and R' represents a radical of the class consisting of aryl and alkaryl radicals and radicals represented by the formulas:

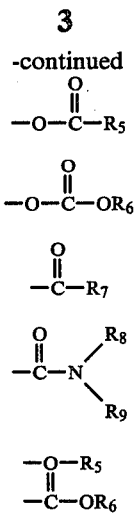

where $R_5$ and $R_6$ each represent a radical selected from the class consisting of alkyl, cycloalkyl, and alkoxyalkyl radicals or hydrogen or alkali metal cations, $R_7$ has the same meaning as $R_5$ and $R_6$ and, in addition, an aryl radical; and $R_8$ and $R_9$ each represent a member of the class consisting of hydrogen and alkyl, cycloalkyl, aryl, alkaryl, aralkyl and alkoxyalkyl radicals.

Preferable compounds represented by the above formulas and useful as monomers herein include styrene, aromatic substituted monomethyl and dimethyl styrene, methyl and other lower alkyl acrylates, acrylic acid, acrylamide, acrylonitrile, methacrylonitrile, vinyl acetate and the like.

If a copolymer is to be produced using the process of the invention, the quaternary ammonium monomer should be present in an amount of at least about 50%, preferably, at least about 75% by weight of the monomeric components.

The particular anionic polymer employed herein depends upon the end use application for which the product is intended. Examples of anionic polymers which may be utilized herein include the homo- and copolymers of alkali metal styrene sulfonates, acrylates and methacrylates. Suitable comonomers may be water-soluble or water-insoluble mono-ethylenically unsaturated monomer copolymerizable with one of the foregoing to produce water-soluble polymers. When water-insoluble comonomers are employed, they are used in amounts insufficient to impair the water-solubility of the resulting copolymer. Common comonomers include acrylamide, methacrylamide, acrylonitrile, methacrylonitrile, styrene, vinyl acetate, vinyl toluene, methyl acrylate, N-vinyl oxazolidinone, and N-vinyl pyrrolidone. Other anionic polymers include the alkali metal and ammonium salts of high copolymers of styrene and substituted styrenes with maleic acid; homo- and copolymers of sulfoalkyl acrylates and carboxyalkyl sacrylates such as sodium sulfoethyl acrylate and sodium carboxyethyl acrylate; carboxyalkyl cellulose ethers such as carboxymethyl cellulose, carboxymethyl methyl cellulose, carboxymethyl hydroxyethyl cellulose and similar derivatives of other polysaccharides such as starch. Additionally, one may wish to utilize certain anionic polymers which are not water-soluble, in which case it will be necessary to utilize either a nonaqueous solvent or a mutual solvent so as to provide a uniform distribution of the monomeric components throughout the anionic polymer solution.

The amount and the choice of the particular anionic polymer to be used will depend upon the properties required for the end use application. In general, the anionic polymer is used in amounts of 0.10 to 3 parts by weight per part of the monomeric components. It has been found that the lower concentrations of polymer result in higher conversion of the monomer to polymer and hence the desired degree of conversion should be considered when deciding the relative amount employed. The preferred amounts of polymer comprise about 0.25 to 1 part per part of the monomeric component(s).

Generally, an aqueous media is used as the polymerization vehicle for the reaction although solvents, particularly those $C_{1-8}$ carbon compounds containing hydroxyl, ketone, aldehyde, ester or halide substitution, may be used. While the use of such solvents does pose some safety problems in processing, in some cases they provide advantages over the use of water in which may make them more desirable. Thus, the manufacture of low molecular weight polymers may be accomplished by using a solvent with a greater transfer constant than water. This would eliminate the need for aqueous chain transfer agents coupled with large amounts of catalyst used to make comparable molecular weight compounds in water. Another advantage to the use of nonaqueous solvents is that the particular monomer to be polymerized may have a greater solubility in the solvent than they would have in water. In such cases, higher concentrations of reactants could be employed and greater through-put realized. The latter approach would be especially useful for reactants which form high viscosity solutions at low concentrations in water. Additionally, as was discussed above, it may also be necessary or desirable to utilize a non-aqueous solvent and/or a mutual co-solvent in the instances wherein anionic polymers are utilized which are not soluble in water. It is to be noted that by proper choice of solvent mixtures, it is possible to utilize any combination of water-soluble and/or water-insoluble monomers and anionic polymers.

Whether water or other solvents (both hereinafter referred to as "solvents") are used, the reactants should be uniformly dispersed throughout the medial in solute or emulsion form, using dispersants or emulsifiers if necessary. Sufficient solvent should be used to homogeneously dissolve or disperse the components throughout the reaction system in order to facilitate the polymerization rate and provide a uniform end product. Amounts of solvent in the range of about 10 to about 90% by weight of the reaction mixture will generally be used. The amount of solvents used will depend, in part, upon the particular drying method employed. Thus, extrusion and calendering processes are usually operated at higher solids levels, e.g. about 70 to 90% dry solids, while spray drying and flash drying are usually carried out at 10 to 40% solids. Drum drying, the preferred polymerization and drying method, is generally carried out at levels of 30 to 85%, preferably 40 to 60%, solids.

The reaction is carried out using conventional free radical polymerization techniques, most commonly in the presence of a free-radical initiator or free-radical precursor. Initiators which are useful in the embodiment wherein water or aqueous alcoholic solutions are used as solvent include the water-soluble peroxy catalysts, preferably a water-soluble salt of persulfuric (perdisulfuric) acid, which salt is preferably used in combination with a sulfoxy type of reducing agent. Other examples of polymerization initiators which are useful include the inorganic and organic peroxides, e.g. the diacyl peroxides, the primary, secondary and tertiary alkyl peroxides and hydroperoxides and esters thereof, the various water-soluble peracetates, perchlorates, percarbonates, perborates, perphosphates, e.g. the ammonium and alkali-metal salts of peracetic, percarbonic, perboric, perphosphoric, persulfuric, perchloric, etc., acids; and water soluble ferric salts capable of yielding ferric ions, e.g. ferric ammonium sulfate, ferric sodium sulfate, etc. In a preferred embodiment, where polymerization and drying take place on a drum drier, cast iron drums may be used and the residual free ferric ions present thereon will provide the necessary initiating activity.

Such water-soluble initiators as mentioned above by way of example are generally employed in combination with a water-soluble activator, for instance, oxygen-containing, sulfur-containing compounds that are capable of undergoing oxidation. Illustrative examples of such activators or adjuvants include sulfur dioxide, the alkali-metal (e.g. sodium, potassium, etc.) bisulfites, hydrosulfites, thiosulfates, sulfurous acid (or compounds which engender sulfurous acid, e.g. alkali-metal sulfites, ethyl and other alkyl sulfites, etc.), various organic sulfinic acid, e.g. p-toluene sulfinic acid, formamideine sulfinic acid, etc. If alkali-metal sulfites, e.g. sodium sulfite or similar compounds which engender sulfurous acid are used, the aqueous solution also should contain a strong acid, e.g. sulfuric acid, etc. in an amount which is at least chemically equivalent to the amount of such a compound engendering sulfurous acid that is employed.

The actual initiator concentration necessary to effect polymerization under the process drying conditions depends upon the reaction temperature, the reaction time and the free-radical initiating temperature of the initiator. Accordingly, the initiator level may vary considerably (e.g. from about 0.1 to about 10% of the monomer weight). Peroxide initiator concentrations are typically greater (e.g. 1-10%) than persulfate initiated systems (e.g. 0.03-3%). In the preferred embodiment wherein drum drying is employed, the persulfate concentration will generally fall within the range of 0.03 to 2.0% by weight monomer and preferably between about 0.05 to about 1.5% with a persulfate concentration ranging from about 0.1 to about 1.2% being most preferred.

When redox initiation systems are used, the reducing agent is incorporated into the feed solution in amounts of about 20–200% by weight based on the concentration of the initiator.

It will be recognized that in cases wherein non-aqueous solvents are employed, it will be necessary that the initiator and activator chosen be soluble in the particular solvent. Suitable initiators and activators useful in this embodiment are well known to those skilled in the art.

It may also be desirable in practicing the present invention to add a buffer to the feed formulation in order to effectively control the pH of the final product. Although this is especially desirable in facilitating the production of a dry product having a neutral pH, so as to prevent attack on the processing equipment by any acid generated during decomposition of the initiator, products of other pH values may also be prepared. These ends could not be accomplished by merely raising the initial pH of the feed with caustic since the quaternary amines decompose above pH 10. The particular buffer chosen can be a salt of any polyprotic weak acid, either organic or inorganic in nature. Typical examples of such buffers are salts of carbonic, phosphoric, succinic and phthalic acids. The buffer selected should be compatible with the particular feed formulation and should be used in sufficient concentration to render a neutral pH to the dry product. The amount of buffer needed will vary depending upon the type buffer used, the type initiator used and the desired pH of the dry product. Typical concentrations necessary to produce the neutral pH product are in the order of 20 to 200% of the concentration of the initiator, preferably 50 to 100%.

Alternatively, premature polymerization (e.g. without concomitant drying) can be effectively avoided by controlling the stage at which the polymerization initiator is introduced into the aqueous dispersion. In processes which, prior to drying, rely upon relatively high temperatures (e.g. greater than 60° C.) for several seconds or more to achieve homogeneous reactant dispersal, initiator addition may be delayed until immediately before or concurrently with the drying step. Conversely, in those processes wherein homogeneous dispersal can be effectively accomplished without exposing the reactants to polymerization conditions before drying, the polymerized catalyst system can be appropriately selected to generate free-radicals when the reactants are exposed to the elevated temperature of the drying step. In general, processes which rely upon relatively high temperature (e.g. greater than 70° C.) at a high solids levels (e.g. less than 40% water) are most suitably conducted under the delayed initiator incorporation techniques whereas the low temperature (e.g. less than 50° C.) and low solids processes (e.g. more than 50% water) are most suitably conducted in the presence of a thermally initiated polymerization catalyst system.

The reactants are simultaneously polymerized and dried to yield the resultant solid mixture of quaternary ammonium homo- or copolymer together with anionic polymer. Illustrative processes for simultaneously polymerizing and drying include extrusion, heat-exchanging, votating, calendering, spray-drying, flash-drying and drum-drying. The polymerization rate will depend upon the reactivity of the monomers, reactant concentration, the efficacy of the catalyst system, the reaction temperature and the polymerization time. The most appropriate thermal conditions depend upon the boiling point of the solvent and also upon the particular apparatus used to simultaneously dry and polymerize the homogeneous dispersion or solution. Usually the simultaneous drying and polymerization temperature will range between 60°–250° C., preferably being accomplished at less than 200° C.

Drum drying processes employing double drums and capable of drying and polymerizing the reactants within about 1 minute to 15 minutes time interval at reaction temperature ranging from about 60° to 170° C. are preferred depending upon the boiling point of the solvent. The temperature and reaction time is appropriately maintained so as to provide the desired final homo- or copolymer. The polymerization and drying conditions are effectively controlled by the operational drum speed, the amount of solution retained at any time in the reservoir formed at the nip between the drums and the drum temperature. Most effective manufacture and improved product functionality is accomplished by dissolving the reactants in water and maintaining the solution in the reservoir for a period of 5–15 minutes. The surface temperature of the drum-drier should range from about 120 to about 160° C. Excessive drum speed or excessively low temperatures may result in incomplete polymerization whereas excessively slow speeds at the elevated temperatures can char the product and are uneconomical.

The homogeneous dispersion or solution application to the drier is at a rate sufficient to permit its drying and polymerization into the desired homo- or copolymer. Excessively thick films or non-uniform application can result in incomplete or non-uniform polymerization and drying of the product. Conversely, too thin of an application can result in product charring (especially at elevated temperatures) or inefficient production. In general, the drum drying processes typically provide a dried film of a thickness ranging from about 1 mil to about 50 mils with about 8 mil to about 10 mils being optimal. If desired, products which are produced in sheet or film form may be ground to a suitable particle size as desired. Particles of size 30 mesh to 200 mesh (U.S.S.S.) have been found to be particularly useful in end use applications such as flocculating wherein these homo- and copolymers are conventionally employed.

The dried product will either disperse in the aqueous system or will form a coacervate therein depending upon the degree of conversion of the monomeric components. While it is difficult to characterize the precise chemical composition of the final product, analysis, to date, indicates that the resultant product may comprise homo- or co-polymer of the monomers mixed with the anionic polymer or graft copolymers of the monomeric components and the anionic polymer. It will be recognized that the specific product formed will depend, in part, on the reactivity of the monomers as well as the ratio of monomer to polymer in the feed solution.

The following examples are exemplary of the present invention.

EXAMPLE I

This example illustrates the reaction of dimethyldiallyl ammonium chloride in the presence of sulfonated polystyrene. A 24-inch wide (24-inch diameter) cast iron double roll drum drier was cleaned to remove surface rust and dirt. The drums were then pre-set with 85 psig steam pressure and rotated at 1.5 RPM. The gap was set at minimum and the blade at 20 psig.

Two mixtures, designated Mix 1 and Mix 2, were prepared using the components and amounts shown below.

| | Ingredient | Amt. (grams) |
|---|---|---|
| Mix 1 | Deionized water | 44.8 |
| | Sodium thiosulfate | 0.98 |
| | Sodium carbonate | 0.83 |
| | Sodium persulfate | 1.2 |
| Mix 2 | Sulfonated polystyrene (28% in water) | 1265 |
| | Dimethyldiallyl ammonium chloride (63% in water) | 187 |

Both mixtures were prepared in separate containers and purged of dissolved oxygen using a 15 minute subsurface nitrogen injection.

A feed mixture was then prepared using equal parts of mix 1 and mix 2 and the feed mixture fed into the nip between the rollers at a rate of 50 ml per minute so as to ensure a residence time of at least about 5 minutes in the resevoir. As the dried product formed on the drums, it was scraped off and the resulting sheet ground on a Cumberland Granulator using a 16 mesh screen.

Analysis of the product (with pH and Brookfield Viscosity measured at 25% solution in water) gave the following results:

| | |
|---|---|
| % Moisture (Cenco - 90 - 10 min.) | 72.2% |
| pH | 6.0 |
| Brookfield Viscosity @ 22° C. (Spindle #2 @ 20 RPM) | 74 cps |
| Residual monomer | 15.9% |
| Color (Gardner) | 2 |

EXAMPLE II

In a manner similar to that described in Example I using a 10 inch wide, 8 inch diameter drum, two additional samples were prepared

| | | A (gms.) | B (gms.) |
|---|---|---|---|
| Mix 1 | Sodium Persulfate | 2.74 | 2.51 |
| | Deionized Water | 11.8 | 10.9 |
| Mix 2 | Dimethyldiallyl ammonium chloride (63% in water) | 274 | 251 |
| | Sulfonated Polystyrene (26% in water) | 72 | 132 |

Analysis of the product as in Example I gave the following results:

| | A | B |
|---|---|---|
| pH | 2.5 | 2.5 |
| Viscosity | 2200 cps | 4700 cps |
| Residual monomer | 11.0% | 10.9% |
| Percent moisture | 4.2% | 5.0% |

EXAMPLE III

Using the procedure described in Example I, additional products may readily be prepared using other quaternary ammonium monomers as the sole monomeric component or combined with other copolymerizable monomers as, for example, acrylamide or acrylic acid. Similarly, the monomeric components may be reacted in the presence of other anionic polymers as, for example, polyvinyl toluene sulfonate. Finally, if desired, solvents other than water may be employed; particularly useful is a methanol/water mixture.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A process for reacting quaternary ammonium monomers in the presence of anionic polymers to directly form a dry coacervate comprising the steps of:
   (a) forming a solution of the monomer(s), anionic polymer, solvent and free-radical initiator;
   (b) simultaneously polymerizing the monomers and drying the solution at a temperature above the boiling point of the solvent; and
   (c) recovering the resultant dry product; wherein the quaternary ammonium monomers are represented by the following formula:

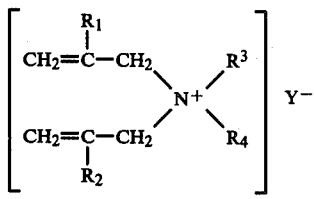

where $R_1$ and $R_2$ each represent a member selected from the group consisting of hydrogen and metyl and ethyl radicals; $R_3$ and $R_4$ each represent a member selected from the group consisting of alkyl, aryl, cycloalkyl, hydroxyalkyl and alkoxyalkyl radicals having from 1 to 18 carbon atoms, and $Y^-$ represents an anion and the anionic polymer is selected from the group consisting of homo- and co-polymers of styrene sulfonates, alkali metal styrene sulfonates, acrylates, mathacrylates, and alkali metal and ammonium salts of copolymers of styrene and substituted styrenes with maleic acid and wherein the anionic polymer is present in an amount of 0.1 to 3 parts by weight per part of the monomers components.

2. The process of claim 1 wherein the quaternary ammonium monomer is selected from the group consisting of the diallyl, dimethyldiallyl, dimethallyl and diethallyl dimethyl, di-(beta-hydroxy-ethyl) ammonium chloride or bromide.

3. The process of claim 2 wherein the quaternary ammonium monomer is dimethyldiallylammonium chloride.

4. The process of claim 1 wherein the quaternary ammonium monomer is selected from the group consisting of the diallyl, dimethyldiallyl, dimethallyl and diethallyl dimethyl, di-(beta-hydroxy-ethyl) ammonium phosphate or sulfate salts.

5. The process of claim 1 wherein there is present a copolymerizable monomer selected from the group consisting of styrene, aromatically substituted monomethyl and dimethyl styrene, methyl and lower alkyl acrylates, acrylic acid, acrylamide, methacrylonitrile, acrylonitrile and vinyl acetate and wherein the latter monomeric component is present in an amount up to about 50% by weight of the combined monomeric components.

6. The process of claim 1 wherein the anionic polymer is selected from the group consisting of homopolymers of alkali metal styrene sulfonates, alkali metal acrylates, alkali metal methacryates, sulfoalkyl acrylates and caroboxyalkyl acrylates and water-soluble copolymers of said sulfonates, acrylates and methacrylates with acrylamide, methacrylamide, acrylonitrile, styrene, vinyl acetate, vinyl toluene and methacrylonitrile.

7. The process of claim 1 wherein the anionic polymer is sulfonated polystyrene.

8. The process of claim 1 wherein the anionic polymer is present in an amount of 0.25 to 1 part by weight per part of the monomeric components.

9. The process of claim 1 wherein water is used as the solvent.

10. The process of claim 1 wherein methanol is used as the solvent.

11. The process of claim 1 wherein the simultaneous polymerizing and drying are carried out using double drum drier at levels of 30 to 85% solids.

12. The process of claim 1 wherein there is additionally present in the solution a buffer in the amount of 20 to 200% by weight of the concentration of the initiator.

13. The process of claim 1 wherein a redox initiator system is employed by additionally incorporating 20–200% by which of a reducing agent into the feed solution in an amount of 20 to 200% by weight based on the weight of the initiator.

* * * * *